US008464765B2

(12) United States Patent
Ansaloni et al.

(10) Patent No.: US 8,464,765 B2
(45) Date of Patent: Jun. 18, 2013

(54) MACHINE FOR FILLING BOTTLES WITH SOLID FORMS OF PHARMACEUTICAL PRODUCTS, IN PARTICULAR CAPSULES, PILLS, PASTILLES, AND/OR TABLETS

(75) Inventors: Angelo Ansaloni, Crespellano (IT); Ernesto Gamberini, Rastignano (IT)

(73) Assignee: MG 2-S.R.L., Pianoro (IT)

( * ) Notice: Subject to any disclaimer, the term of this patent is extended or adjusted under 35 U.S.C. 154(b) by 0 days.

(21) Appl. No.: 13/439,925

(22) Filed: Apr. 5, 2012

(65) Prior Publication Data
US 2012/0305133 A1 Dec. 6, 2012

(30) Foreign Application Priority Data

Apr. 6, 2011 (IT) ................ BO2011A0180

(51) Int. Cl.
*B65B 37/00* (2006.01)
*B65B 1/30* (2006.01)
(52) U.S. Cl.
USPC ............ 141/239; 141/145; 141/83; 53/253; 53/247; 53/250
(58) Field of Classification Search
USPC ............ 141/34, 83, 144–145, 237–239, 270, 141/283; 53/247, 250, 253
See application file for complete search history.

(56) References Cited

U.S. PATENT DOCUMENTS

| 5,143,126 | A  | * | 9/1992  | Boesch et al.   | 141/1   |
|-----------|----|---|---------|-----------------|---------|
| 6,814,111 | B1 | * | 11/2004 | Oliverio et al. | 141/237 |
| 7,073,658 | B2 | * | 7/2006  | Biancoli et al. | 198/757 |
| 7,726,101 | B2 | * | 6/2010  | Frabetti        | 53/471  |
| 7,857,014 | B2 | * | 12/2010 | Gamberini       | 141/239 |
| 2003/0070725 | A1 |   | 4/2003  | Gershman        |         |
| 2012/0072017 | A1 | * | 3/2012  | Kim             | 700/231 |
| 2012/0304594 | A1 | * | 12/2012 | Ansaloni et al. | 53/55   |

FOREIGN PATENT DOCUMENTS

| EP | 0 622 296    | 11/1994 |
| EP | 1 834 905    | 9/2007  |
| EP | 2 006 204    | 12/2008 |
| EP | 2 030 895    | 3/2009  |
| WO | WO 01/38202 A2 | 5/2001 |
| WO | WO 2009/038378 | 3/2009 |
| WO | WO 2010/022336 | 2/2010 |

* cited by examiner

*Primary Examiner* — Timothy L Maust
*Assistant Examiner* — Timothy Kelly
(74) *Attorney, Agent, or Firm* — Gottlieb, Rackman & Reisman, P.C.

(57) ABSTRACT

A machine for filling bottles with solid forms of pharmaceutical products is provided with a conveying device for continuously moving forward a sequence of bottles along a given path, and a vibrating distribution plate, which is mounted along the path itself so as to continuously rotate around its own longitudinal axis, and has a plurality of feeding channels, each of which is wound in a helix around and along said longitudinal axis, and is moved forward in phase with a corresponding bottle to feed a given number of solid forms in the bottle itself.

10 Claims, 10 Drawing Sheets

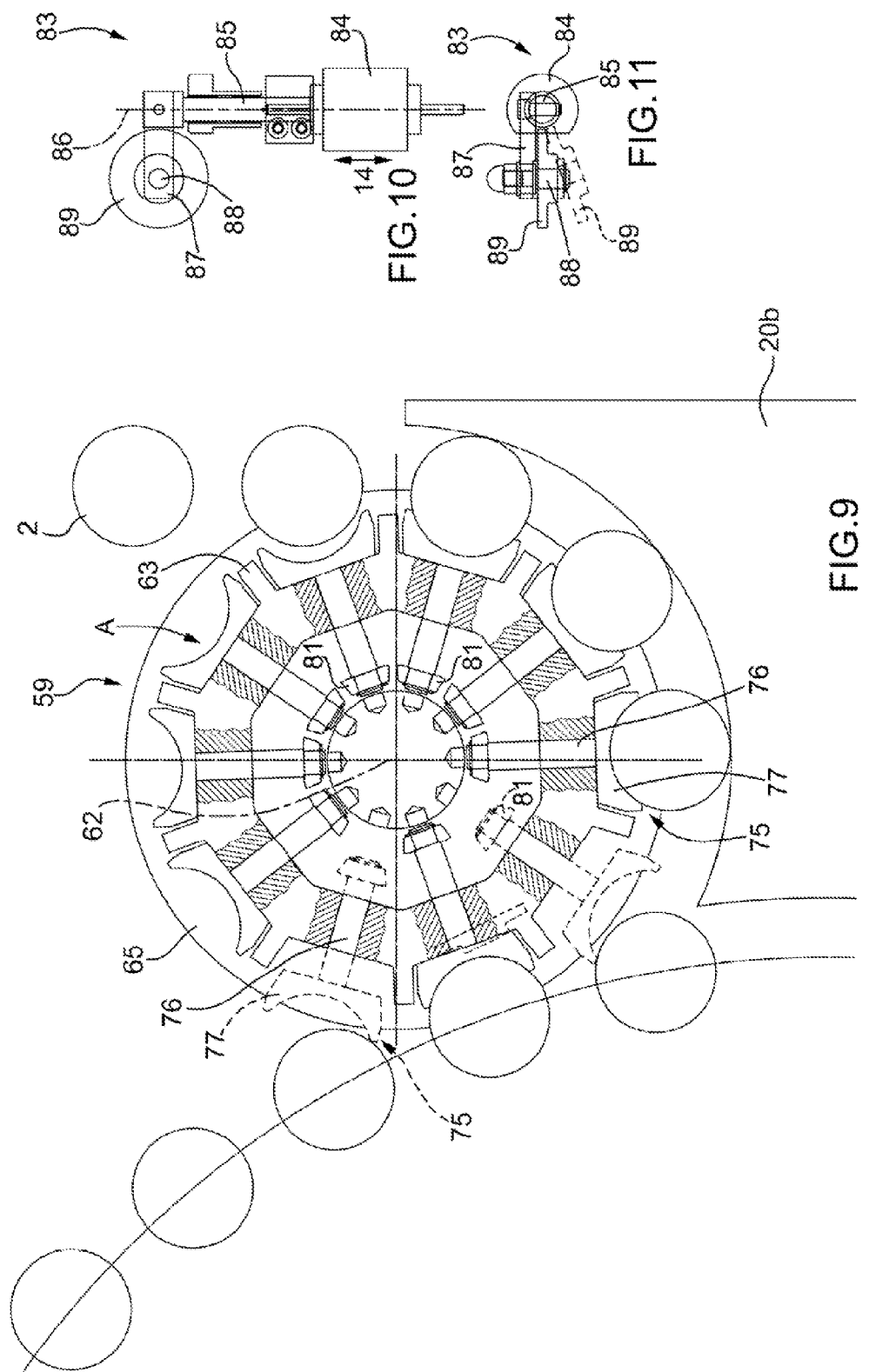

MACHINE FOR FILLING BOTTLES WITH SOLID FORMS OF PHARMACEUTICAL PRODUCTS, IN PARTICULAR CAPSULES, PILLS, PASTILLES, AND/OR TABLETS

The present invention relates to a machine for filling bottles with solid forms of pharmaceutical products, in particular capsules, pills, pastilles, and/or tablets.

BACKGROUND OF THE INVENTION

In the pharmaceutical field, it is known to manufacture a filling machine of the type comprising a conveying device to sequentially move forward a plurality of bottles along a given path and through a filling station; and a dosing device mounted in the filling station to feed a given number of solid forms into each bottle.

The dosing device is mounted over a rectilinear segment of the bottle path, and has a plurality of feeding channels, which extend along respective parallel, vertical containing planes aligned with each other, and each comprise a respective, substantially horizontal vibrating inlet portion, and a respective, substantially vertical outlet portion suited to discharge the solid forms received from the vibrating inlet portion into the corresponding bottle.

The machine further comprises a counting device comprising, in turn, for each feeding channel, a respective sensor suited to detect the passage of each solid form along the corresponding outlet portion, and an electronic control unit, connected to the sensors for calculating the total number of solid forms moved forward along the outlet portion of each feeding channel and stopping the corresponding vibrating inlet portion when a given threshold value is reached.

Since the bottles are moved forward by the conveying device in an intermittent manner underneath the feeding channels of the dosing device, the productivity of filling machines of the above-described known type is relatively low.

Furthermore, the known filling machines of the above-described type are relatively complex and costly because they imply an intermittent operation of the vibrating inlet portions, which must be alternately activated to allow the solid forms to drop into the corresponding outlet portions and deactivated in response to a signal from the counting device, so as to stop the solid forms from falling into the corresponding outlet portions and to ensure the correct filling of the bottles arranged each time in the filling station.

SUMMARY OF THE INVENTION

It is the object of the present invention to provide a machine for filling bottles with solid forms of pharmaceutical products, in particular capsules, pills, pastilles, and/or tablets which is free from the above-described drawbacks and which is simple and cost-effective effective to be implemented.

According to the present invention, there is provided a machine for filling bottles with solid forms of pharmaceutical products, in particular capsules, pills, pastilles, and/or tablets, as claimed in the appended claims.

BRIEF DESCRIPTION OF THE DRAWINGS

The present invention will now be described with reference to the accompanying drawings, which show a non-limitative embodiment thereof, in which:

FIG. 9 is a diagrammatic plan view, with parts removed for clarity, of a second detail in FIG. 7;

FIG. 10 is a diagrammatic side view, with parts removed for clarity, of a third detail in FIG. 7;

FIG. 11 is a diagrammatic plan view, with parts removed for clarity, of the detail in FIG. 10.

DETAILED DESCRIPTION OF THE INVENTION

Figure 1:
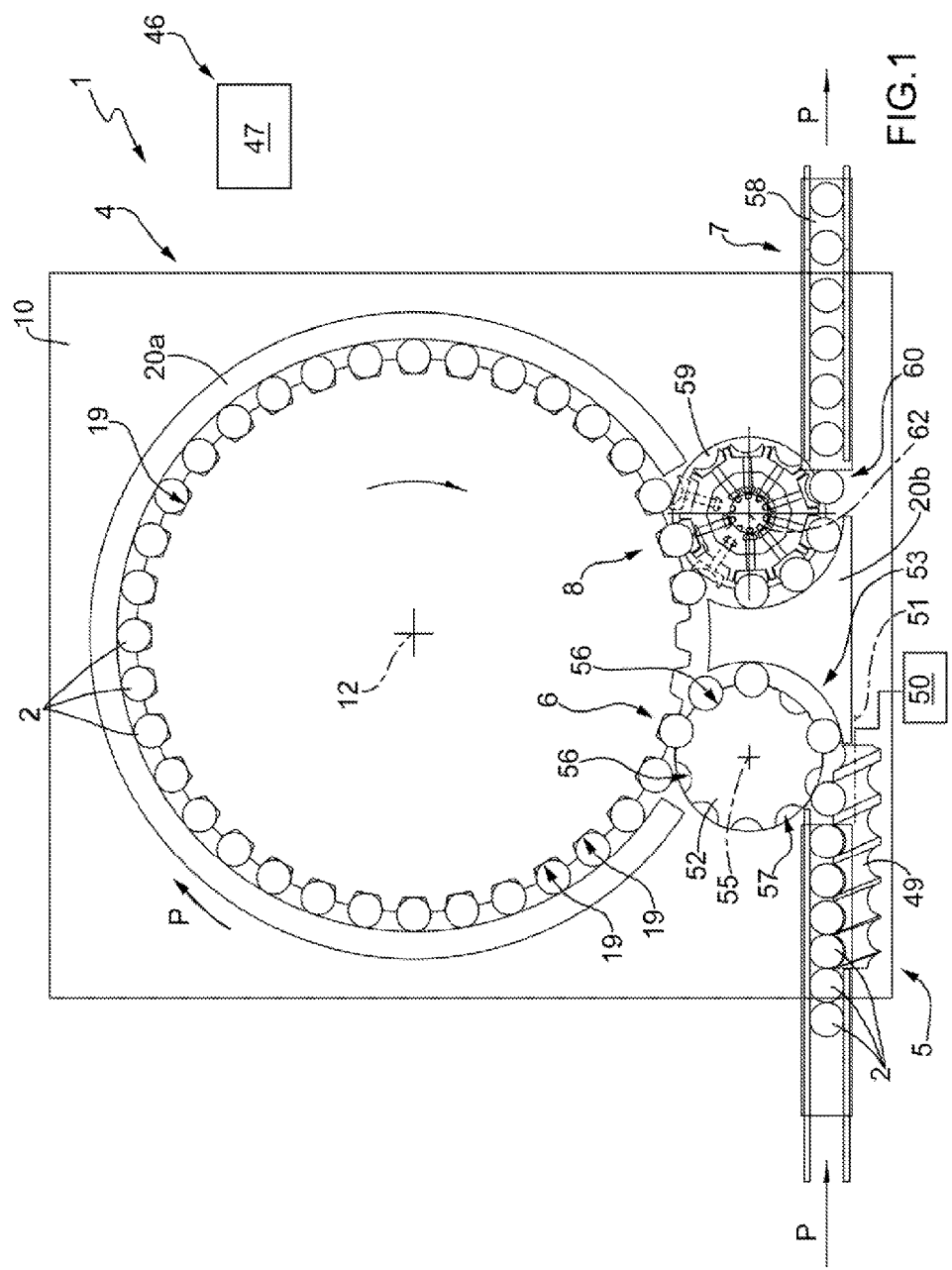
FIG. 1 is a diagrammatic plan view, with parts removed for clarity, of a preferred embodiment of the filling machine of the present invention.

With reference to FIG. 1, numeral 1 indicates, as a whole, a machine for filling bottles 2 with solid forms 3 (FIG. 3) of pharmaceutical products, for example capsules, pills, pastilles, and/or tablets.

Machine 1 comprises a dosing wheel 4 of the solid forms 3 into bottles 2; a feeding device 5, which feeds the empty bottles 2 to wheel 4, and is connected to wheel 4 at a transfer station 6; and a picking device 7, which picks the filled bottles 2 from wheel 4, and is connected to the wheel 4 itself at a transfer station 8.

Figure 2:
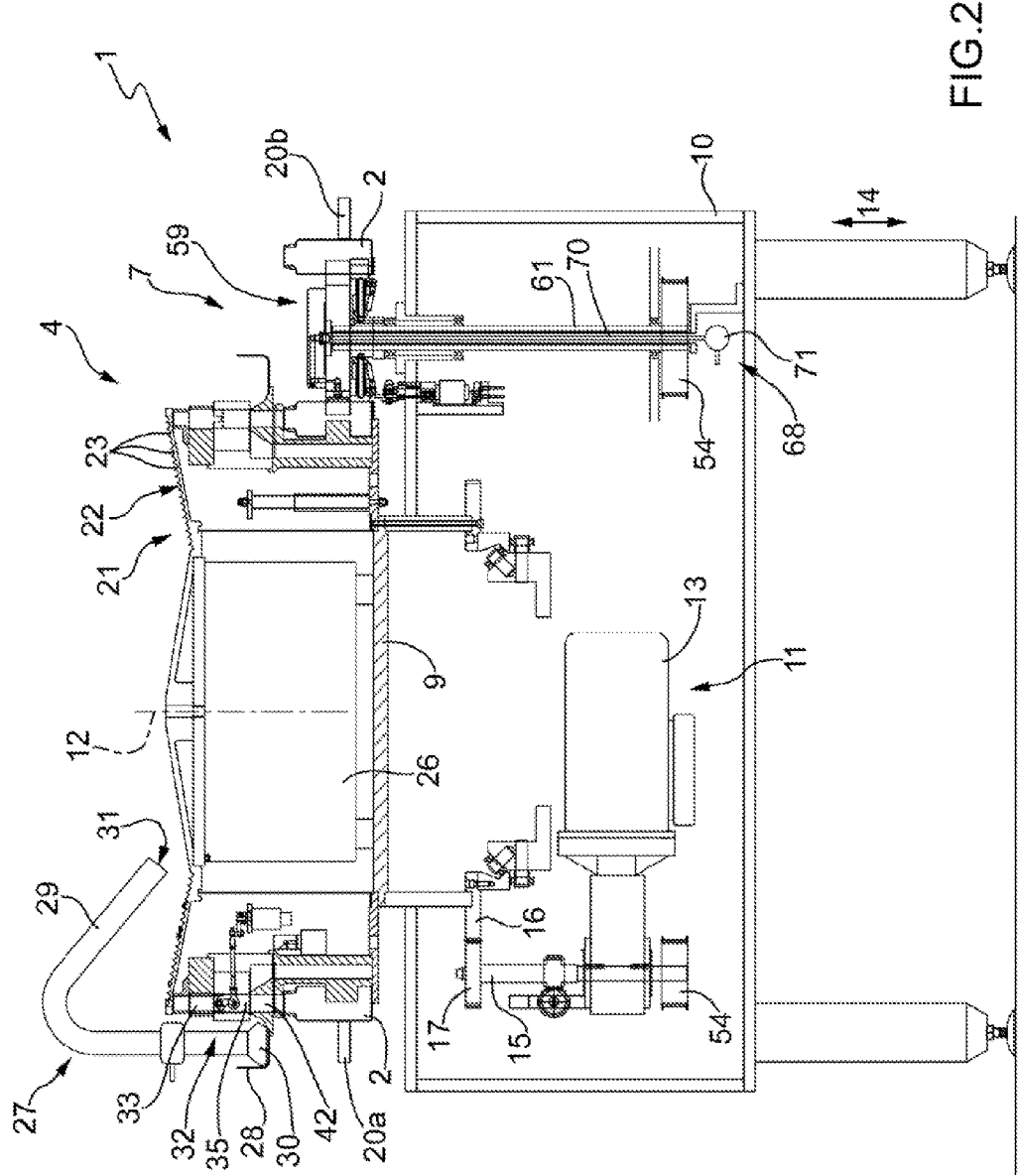
FIG. 2 is a diagrammatic side view, with parts removed for clarity, of a detail of the filling machine in FIG. 1.
Figure 3:
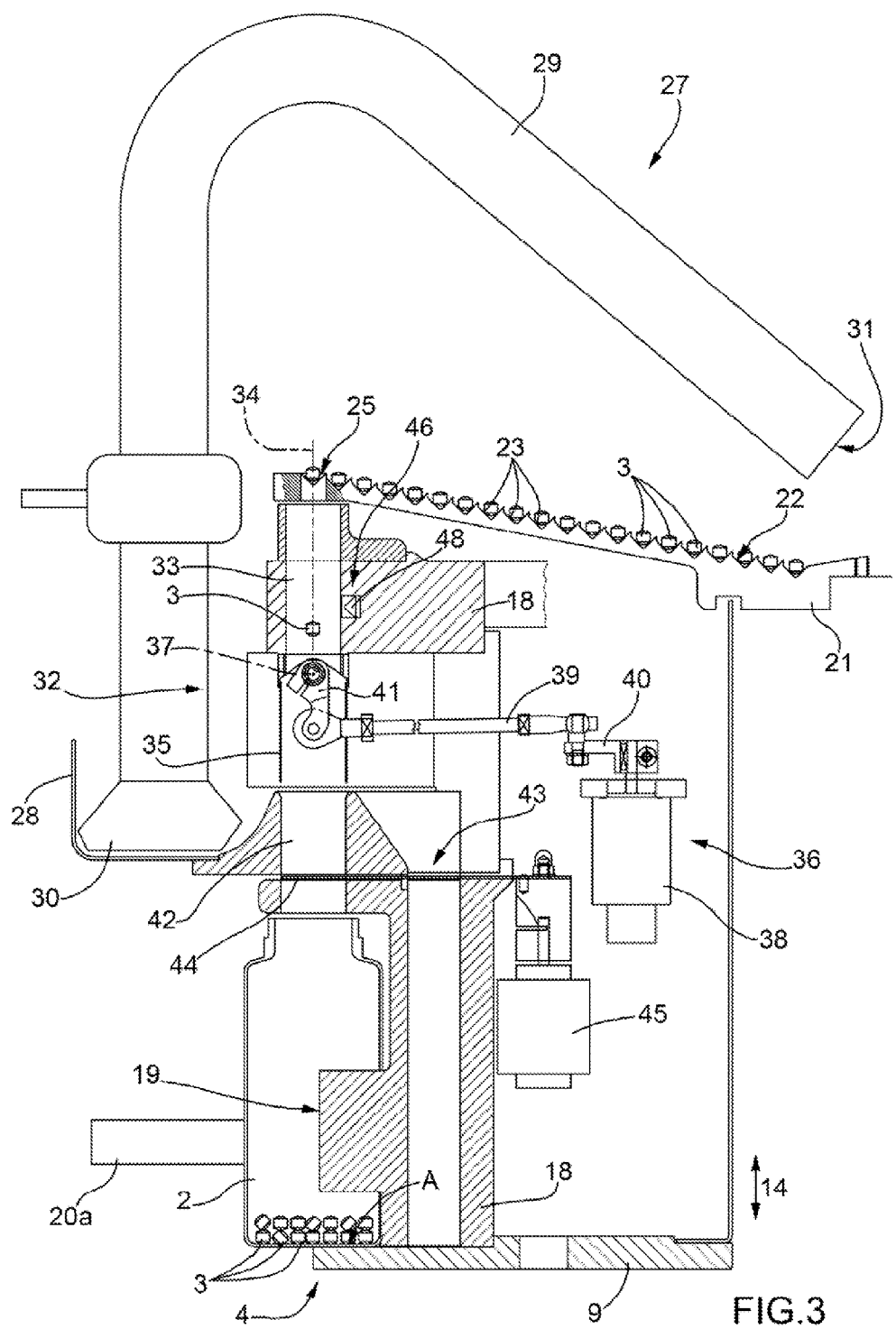
FIGS. 3 and 4 are two diagrammatic side views, with parts in section and parts removed for clarity, of a first detail in FIG. 2 shown in two different operating positions.

As shown in FIGS. 2 and 3, wheel 4 comprises a lower disc 9, which is pivotally coupled to a fixed support frame 10 to continuously rotate, with respect to the frame 10 and under the bias of an actuating device 11, around a longitudinal, substantially vertical axis (clockwise in FIG. 1), and has a peripheral edge defining a substantially horizontal resting plane A for the bottles 2.

Device 11 comprises an electric motor 13, which is accommodated inside frame 10 under disc 9, extends in a vertical direction 14 parallel to axis 12, and is connected to a drive shaft 15 coupled to disc 9 by means of a pair of gears 16, 17 fixed to the disc 9 and to the shaft 15, respectively.

Wheel 4 further comprises a star drum 18, which is fixed to disc 9 coaxially to axis 12, and has a plurality of pockets 19, which are each suited to receive and withhold a respective bottle 2, are obtained along a peripheral edge of drum 18, are uniformly distributed around axis 12, are limited at the bottom by disc 9, and are radially closed outwards by two containment tiles 20a, 20b (FIG. 1), which extend around axis 12, and are fixed to frame 10 between stations 6 and 8.

The solid forms 3 are fed into the bottles 2 by a distribution plate 21, which is mounted over the drum 18, coaxially to axis 12, and is limited at the bottom by a bottom wall 22, substantially shaped as a truncated cone, on which a plurality of feeding channels 23, equal in number to the number of pockets 19, are obtained.

Figure 5:
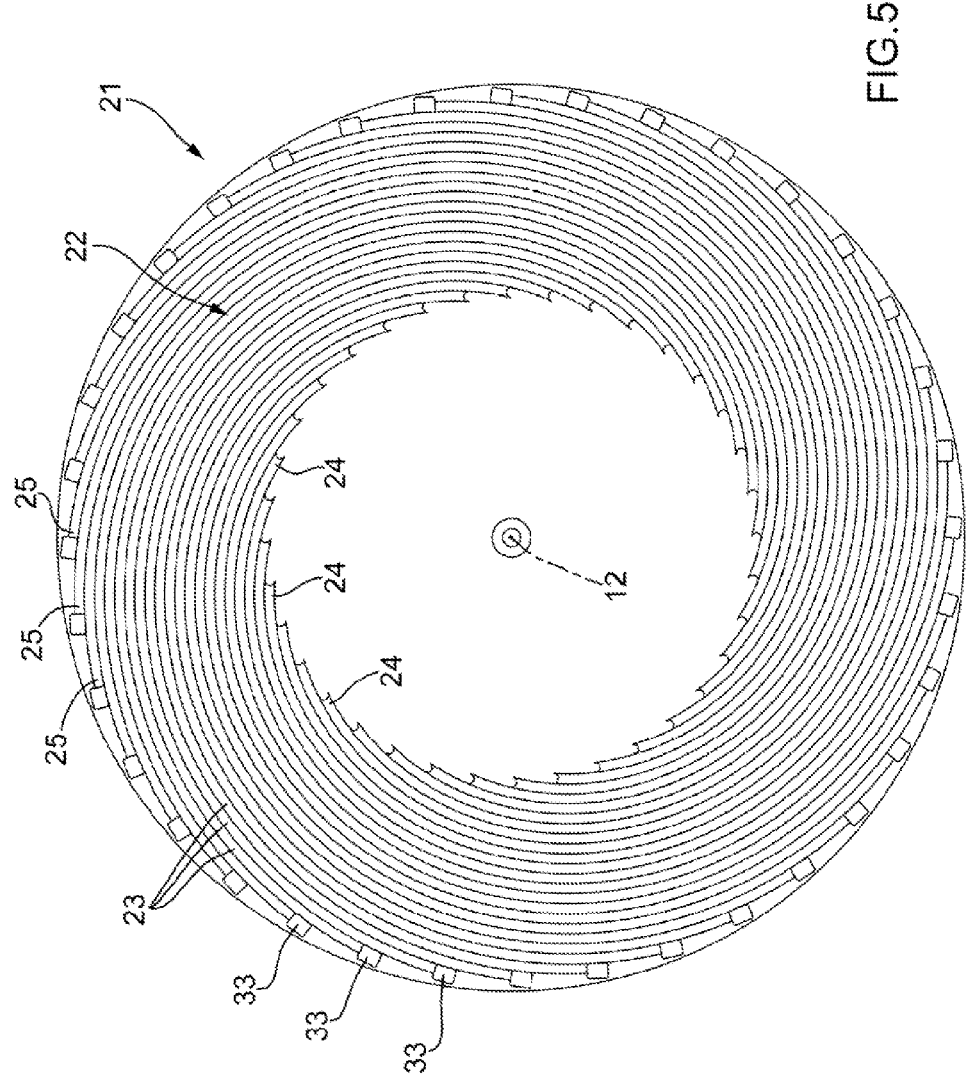
FIG. 5 is a diagrammatic plan view of a first detail in FIGS. 3 and 4.

With reference to FIG. 5, each channel 23 is wound as a helix around and along said axis 12, has a lower inlet 24 for the solid forms 3 to be fed into channel 23 and an upper outlet 25 for the solid forms 3 to be discharged from the channel 23 itself, and has a width such as to allow the solid forms 3 to move forward in sequence along the channel 23 itself.

As shown in FIGS. 2 and 3, plate 21 is fixed to a vibrating base 26 of known type, fixed in turn onto the disc 9 coaxially to axis 12, and suited to impart a vibrating motion to plate 21 according to a given law so as to sequentially move forward the solid forms 3 along channels 23.

Wheel 4 is further provided with a recirculating device 27 suited to collect the solid forms 3 moved forward through the outlets 25 of channels 23 and to feed them back into plate 21.

Device 27 comprises an annular collecting manifold 28, which is fixed to the drum 18 coaxially to axis 12, is open at the top in direction 14, and has a diameter which is greater than the diameter of drum 18 and plate 21, and a suction tube 29 which is fixed to the frame 10, is substantially U-shaped with its concavity facing downwards, and comprises an inlet 30 facing the collecting manifold 28 and an outlet 31 facing the plate 21.

Wheel 4 further comprises a respective discharge duct 32 for each channel 23, which discharge duct 32 allows to selectively discharge the solid forms 3 fed through the respective outlet 25 into the corresponding bottle 2 or into the collecting manifold 28, and comprises, in turn, an upper portion 33, which has a longitudinal axis 34 parallel to direction 14, is obtained in part through the plate 21 and in part through the drum 18, and is vertically aligned with the corresponding outlet 25 and to the corresponding bottle 2 in the direction 14 itself.

Figure 4:
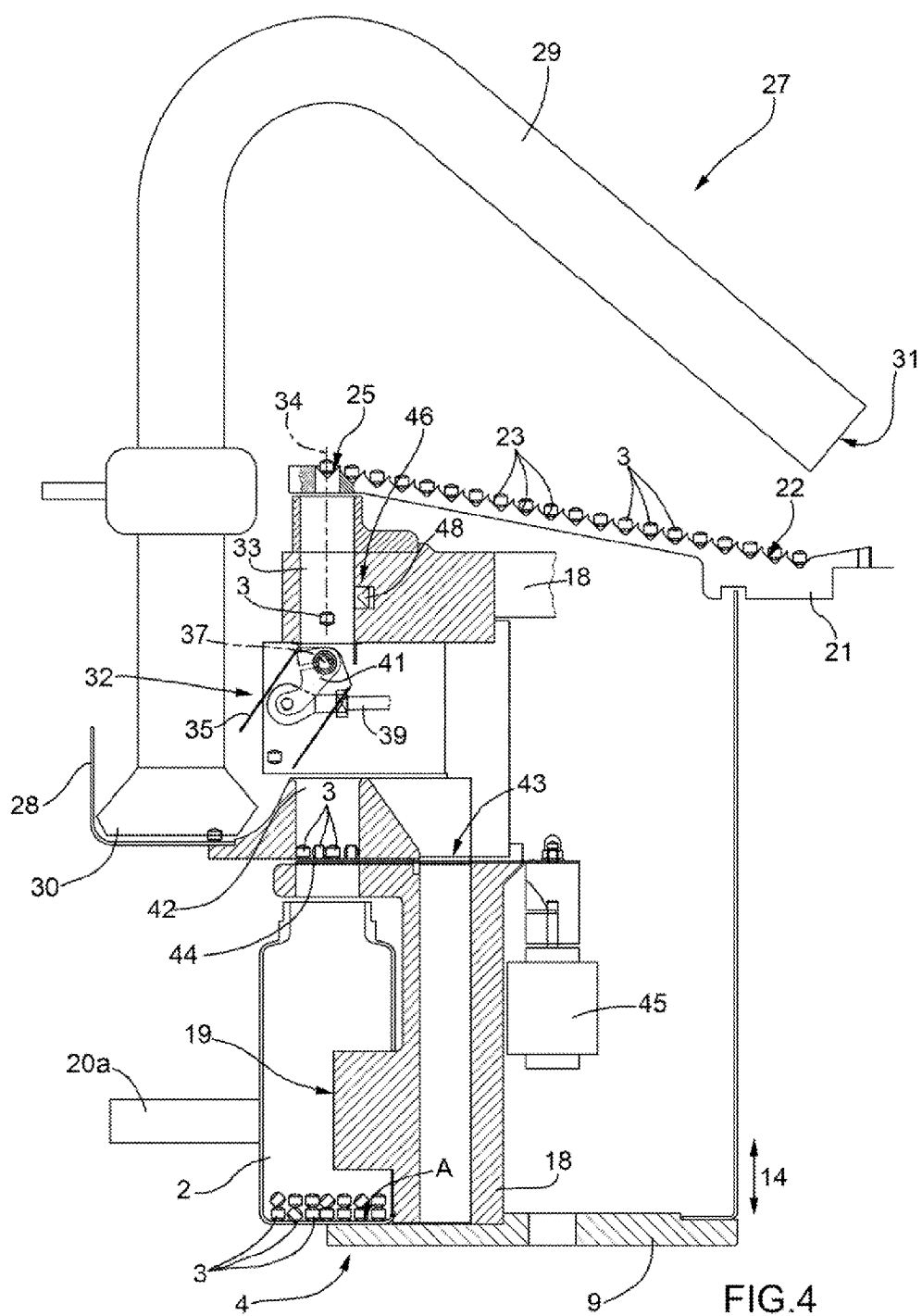

Duct 32 further comprises an intermediate portion 35, which extends under portion 33, and is hinged to drum 18 to rotate with respect to drum 18 under the bias of an actuating device 36 around a horizontal fulcrum 37 transversal to axis 12 between a first operating position (FIG. 3), where the two portions 33 and 35 are substantially aligned with and coaxial to each other to feed the solid forms 3 into bottle 2, and a second operating position (FIG. 4), where portion 35 is inclined with respect to portion 33 so as to be arranged over the collecting manifold 28 and feed the solid forms 3 into the collecting manifold 28 itself.

Device 36 comprises an electric motor 38 fixed to drum 18 parallel to direction 14, and a horizontal tie-rod 39, which extends transversally to direction 14, is slidingly coupled to drum 18, is connected to an outlet shaft of the motor 38 by interposing a first crank 40, and is connected to portion 35 by interposing a second crank 41.

Duct 32 further comprises a bottom portion 42, which is obtained through the drum 18 coaxially to axis 34, and extends between portion 35 and bottle 2.

Figure 6:
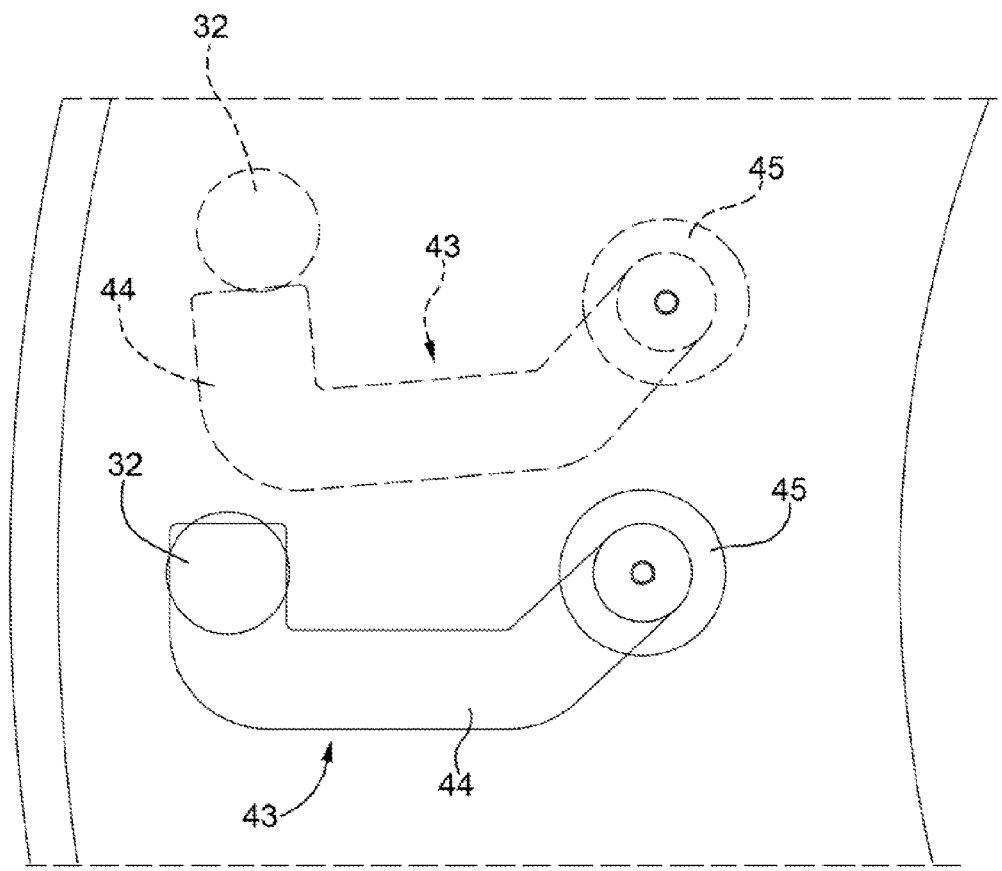
FIG. 6 is a diagrammatic plan view, with parts removed for clarity, of a second detail in FIGS. 3 and 4.

With reference to FIGS. 3 and 6, a stop device 43 is further associated with each channel 23, suited to prevent the solid forms 3 from falling into the corresponding bottle 2 irrespective of the position of the corresponding portion 35 around axis 37.

Device 43 comprises a flat gate 44, which extends perpendicularly to direction 14, is mounted under portion 35, and is fixed to the upper free end of the outlet shaft of an electric motor 45 fixed to drum 18 parallel to direction 14. Gate 44 is moved by motor 45 between a release position (shown by a dashed line in FIG. 6), in which gate 44 is arranged substantially outside duct 32 to allow the solid forms 3 to fall into bottle 2, and a stop position (shown by a solid line in FIG. 6), in which gate 44 is arranged inside portion 42 to close the duct 32 at the bottom and prevent the solid forms 3 from falling into bottle 2.

As shown in FIGS. 1 and 3, machine 1 is further provided with a counting device 46 comprising an electronic control unit 47 and, for each duct 32, a respective sensor, in this case a photocell 48, mounted along the portion 33 to detect the passage of each solid form 3. The control unit 47 is connected to photocells 48 to calculate the total number of solid forms 3 fed through the outlet 25 of each channel 23.

The feeding device 5 comprises an auger 49, which is fitted to continuously rotate with respect to the frame 10 and under the bias of an actuating device 50 independent from device 11 around a substantially horizontal, longitudinal axis 51 thereof, transversal to axis 12, and is suited to receive a sequence of bottles 2 and to order them according to a distribution pitch which is substantially equal to the distribution pitch of the pockets 19 around axis 12.

The empty bottles 2 are transferred from auger 49 to a star wheel 52, which is connected to wheel 4 at the station 6, is connected to auger 49 at a transfer station 53, and is further connected to motor 13 by means of a belt transmission 54 (FIG. 2) to continuously rotate with respect to frame 10, around a longitudinal axis thereof 55, parallel to axis 12 (counterclockwise in FIG. 1).

Wheel 52 has a plurality of pockets 56 of substantially semi-cylindrical shape, which are uniformly distributed around axis 55 with a distribution pitch equal to the distribution pitch of the pockets 19 around axis 12, are radially closed outwards by the tile 20b during their forward movement from station 53 to station 6, and are limited at the bottom by a disc 57, which is substantially coplanar to plane A, and is mounted to rotate around axis 55.

The picking device 7 defines, in combination with wheel 4 and device 5, a conveying line of the bottles 2 along a given path P, and comprises an outlet belt conveyor 58 and a star wheel 59, which is suited to transfer the filled bottles 2 from the wheel 4 to the conveyor 58, is connected to wheel 4 at the station 8, and is further connected to the conveyor 58 itself at a transfer station 60.

Figure 7:
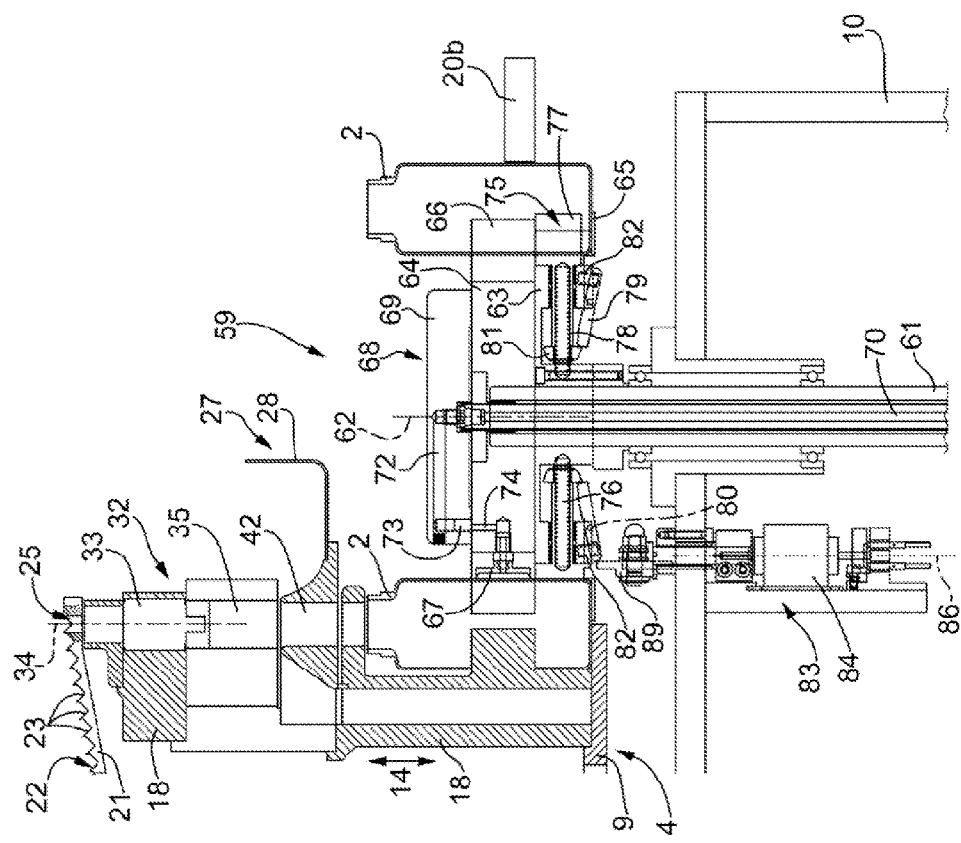
FIG. 7 is a diagrammatic side view, with parts in section and parts removed for clarity, of a second detail in FIG. 2.

With reference to FIGS. 2 and 7, wheel 59 comprises a tubular support shaft 61, which is mounted to continuously rotate, with respect to frame 10 and under the bias of the motor 13 and the belt drive 54, around a longitudinal axis 62 thereof, parallel to direction 14, and which extends through frame 10 so as to protrude outside from the top of the frame 10 itself.

Shaft 61 supports a lower disc 63 fixed to shaft 61 coaxially to axis 62, an upper disc 64 fixed to shaft 61 coaxially to axis 62 and arranged in contact with disc 63, and an annular plate 65, fixed under the disc 63 itself to define a resting plane for the bottles 2 substantially coplanar with plane A.

Figure 8:
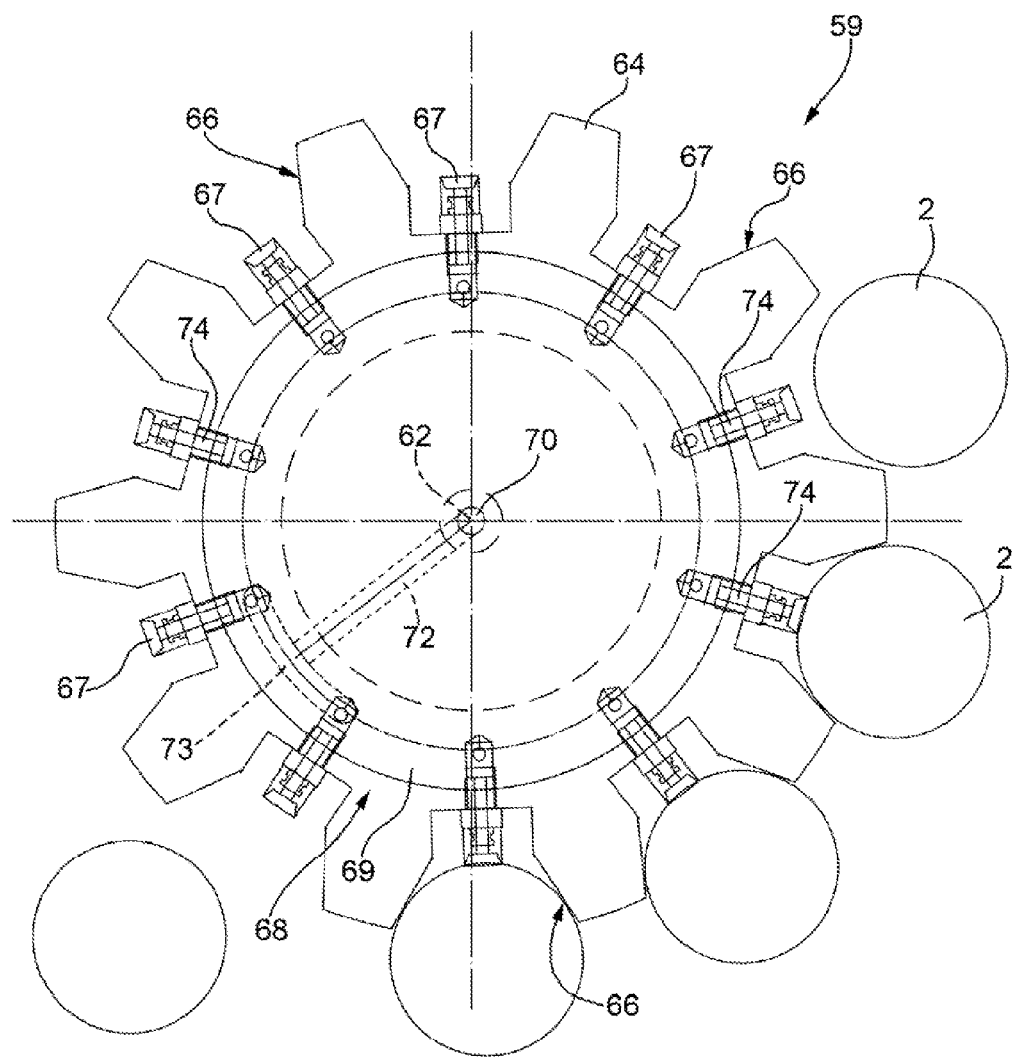
FIG. 8 is a diagrammatic plan view, with parts removed for clarity, of a first detail in FIG. 7.

As shown in FIGS. 7 and 8, disc 64 has a plurality of seats 66, which are obtained along a peripheral edge of disc 64, are suited to each receive and withhold a respective bottle 2, and are uniformly distributed around axis 62 with a distribution pitch substantially equal to the distribution pitch of the pockets 19 around axis 12. Seats 66 are limited at the bottom by plate 65, and are radially closed outwards by tile 20b during the forward movement thereof from station 8 to station 60.

Each seat 66 is suited to pick a bottle 2 from a respective pocket 19 by means of a suction cup 67, which extends into seat 66, and is suited to be connected to a pneumatic suction circuit 68 at station 8.

Circuit 68 comprises a distribution disc 69, which is mounted over disc 64 coaxially to axis 62, has a lower face substantially fluid-tightly coupled to an upper face of disc 64, and is fixed to an upper edge of a suction duct 70, which extends into shaft 61, is fixed to frame 10 at a lower end thereof protruding outside shaft 61, and is suited to be selectively connected to a pneumatic suction device (known and not shown) by means of a solenoid valve 71 connected to the control unit 47.

Circuit 68 further comprises a duct 72, which is obtained through the disc 69, is connected to duct 70, and has a suction mouth 73, which is obtained in the disc 69 at station 8, extends around axis 62 according to a given angle, and opens outwards at the lower face of disc 69.

When crossing the station 8, each suction cap 67 is pneumatically connected to mouth 73 by means of a corresponding duct 74, which is obtained through disc 64, opens outwards at the upper face of disc 64, and is moved forward by wheel 59 under the mouth 73 itself.

With reference to FIGS. 7 and 9, disc 63 has a plurality of pushing members 75, the number of which is equal to the number of seats 66, which are uniformly distributed around axis 62, and are each associated with a corresponding seat 66 to release bottle 2 from the seat 66 itself.

Each member 75 comprises an elongated rod 76, which radially extends outwards through the disc 63, supports a fork 77 fixed to a free end of rod 76, and is slidingly coupled to disc 63 to move transversally to axis 62 with respect to the disc 63 itself.

Rod 76 is moved to an extracted position (shown by a dashed line in FIG. 9), in which fork 77 radially protrudes outwards from the corresponding suction cap 67, by a spring 78 interposed between disc 63 and the rod 76 itself, and is locked in a retracted position (shown by a solid line in FIG. 9), in which fork 77 does not protrude radially outwards from the corresponding suction cap 67, by a rocker arm 79 hinged to disc 63 to pivot with respect to disc 63, around a fulcrum axis 80 transversal to axis 62.

The rocker arm 79 is normally maintained in a lock position (FIG. 7), in which a first arm of the rocker arm 79 engages a coupling flange 81 obtained around rod 76, by a spring 82 interposed between disc 63 and a second arm of the rocker arm 79, and is moved to a release position (not shown), in which the first arm of the rocker arm 79 releases flange 81 to allow the spring to move rod 76 to its extracted position, by an actuating device 83 connected to the control unit 47.

As shown in FIGS. 7, 10, and 11, device 83 comprises an electromagnet 84, which is fixed to frame 10 at the station 8, and has an outlet shaft 85, which is mounted to rotate around a longitudinal axis 86 thereof parallel to direction 14, and carries a horizontal bracket 87 connected to an upper free end thereof transversally to the axis 86.

Device 83 further comprises a horizontal pin 88, which extends through bracket 87 orthogonally to axis 86 and to the bracket 87 itself, and supports a roller 89 which is pivotally coupled to pin 88, and is moved by the rotation of shaft 85 around axis 86 between an operating position (not shown), in which roller 89 is arranged within the forward movement path of the rocker arms 79 around axis 62 to engage the rocker arms 79 and to move them to their release positions, and a resting position (FIG. 7), in which roller 89 is arranged outside the forward movement path of the rocker arms 79 around axis 62.

The operation of machine 1 will now be described with reference to a pocket 19 only and starting from a moment in which:

the considered pocket 19 is moved forward by wheel 4 through the transfer station 6, in phase with a pocket 56 of the star wheel 52 and thus with a bottle 2;

the intermediate portion 35 of the discharge duct 32 associated with the considered pocket 19 is arranged in its second operating discharge position of the solid forms 3 to the recirculating device 27;

the gate 44 of the considered duct 32 is arranged in its release position;

the roller 89 is arranged in its resting position;

the rockers arms 79 are arranged in their lock positions; and the rods 76 and thus the forks 77 are arranged in their retracted positions.

Once bottle 2 has been transferred from pocket 56 to wheel 52, the portion 35 is moved into its first operating discharge position of the solid forms 3 into the bottle 2 itself, and the passage of each solid form 3 along the upper portion 33 of duct 32 is detected by the photocell 48.

When the control unit 47 detects the passage of a total number of solid forms 3 equal to a given threshold value, the actuating device 36 is activated to move portion 35 back to its second operating position and to allow wheel 4 to move forward bottle 2 with the correct number of solid forms 3 through the transfer station 8, in phase with a seat 66 of wheel 59.

At the station 8, duct 74 of the considered seat 66 engages the suction mouth 73 so as to connect the suction cap 67 to the pneumatic circuit 68, to extract bottle 2 from pocket 19, and to hold it within seat 66. Once the bottle 2 has been inserted into tile 20b, the duct 74 of the considered seat 66 disengages the mouth 73 to finally allow wheel 59 to release the bottle 2 itself onto the belt conveyor 58 at the station 60.

According to a further operating mode, when the bottle 2 has been filled with a total number of solid forms 3 equal to the threshold value stored in the control unit 47, gate 44 is moved to its stop position, and portion 35 is maintained in its first operating position to allow the solid forms 3 to fall onto the gate 44 itself.

When the number of solid forms 3 accumulated on gate 44 is lower or not higher than the threshold value stored in the control unit 47, portion 35 is moved again to its second operating position in order to deviate the solid forms 3 towards the recirculating device 27.

Once the filled bottle 2 has been transferred to the wheel 59 at the station 8 and a new empty bottle 2 has been picked from the wheel 52 at the station 6, gate 44 is moved to its release position to allow the solid forms 3 accumulated on gate 44 to drop into the new bottle 2.

If the number of solid forms 3 accumulated on gate 44 is equal to the threshold value stored in the control unit 47, gate 44 is immediately moved to its stop position so as to prevent further solid forms 3 from dropping into bottle 2; while if the number of solid forms 3 accumulated on gate 44 is lower than the threshold value stored in the control unit 47, gate 44 is firstly maintained in its release position to complete the filling of bottle 2 and is then moved to its stop position.

According to a third operating mode, the bottle 2 fed through station 8 with therein a total number of solid forms 3 lower than the threshold value stored in the control unit 47, is not transferred to wheel 59 and left on wheel 4 to complete the filling thereof during a second movement of the bottle 2 itself from station 6 to station 8.

With this regard, the control unit 47 controls the closing of the solenoid valve 71 so as to prevent the suction cap 67 of the considered seat 66 from aspirating the bottle 2 in the seat 66 itself, and operates the device 83 to move roller 89 into its operating position, to release the rocker arm 79, and to allow spring 78 to move the fork 77 to its extracted position so as to maintain the bottle 2 inside pocket 19 and to insert it into tile 20b.

In order to prevent the feeding device 5 from moving forward a new empty bottle 2 inside the pocket 19 still occupied by the incomplete bottle 2, auger 49 is firstly stopped so as to allow to move forward an empty pocket 56 through station 6 in phase with the considered pocket 19, and is then activated again so as to resume the regular feeding of the empty bottles 2 to the station 6 itself.

Following the forward movement of the fork 77 arranged in the extracted position downstream of station 8, roller 89 is moved back to its resting position and disengaged from the forward movement path of the rocker arms 79, the solenoid valve 71 is opened again, and the rocker arm 79 is moved back to its lock position by means of spring 82.

At this point, fork 77 is moved forward again through the station 8 in phase with a new bottle 2, which engages fork 77 and, being radially locked inside pocket 19, moves rod 76 to its retracted position against the bias of the spring 78, so as to couple the flange 81 with the rocker arm 79.

Figure 12:
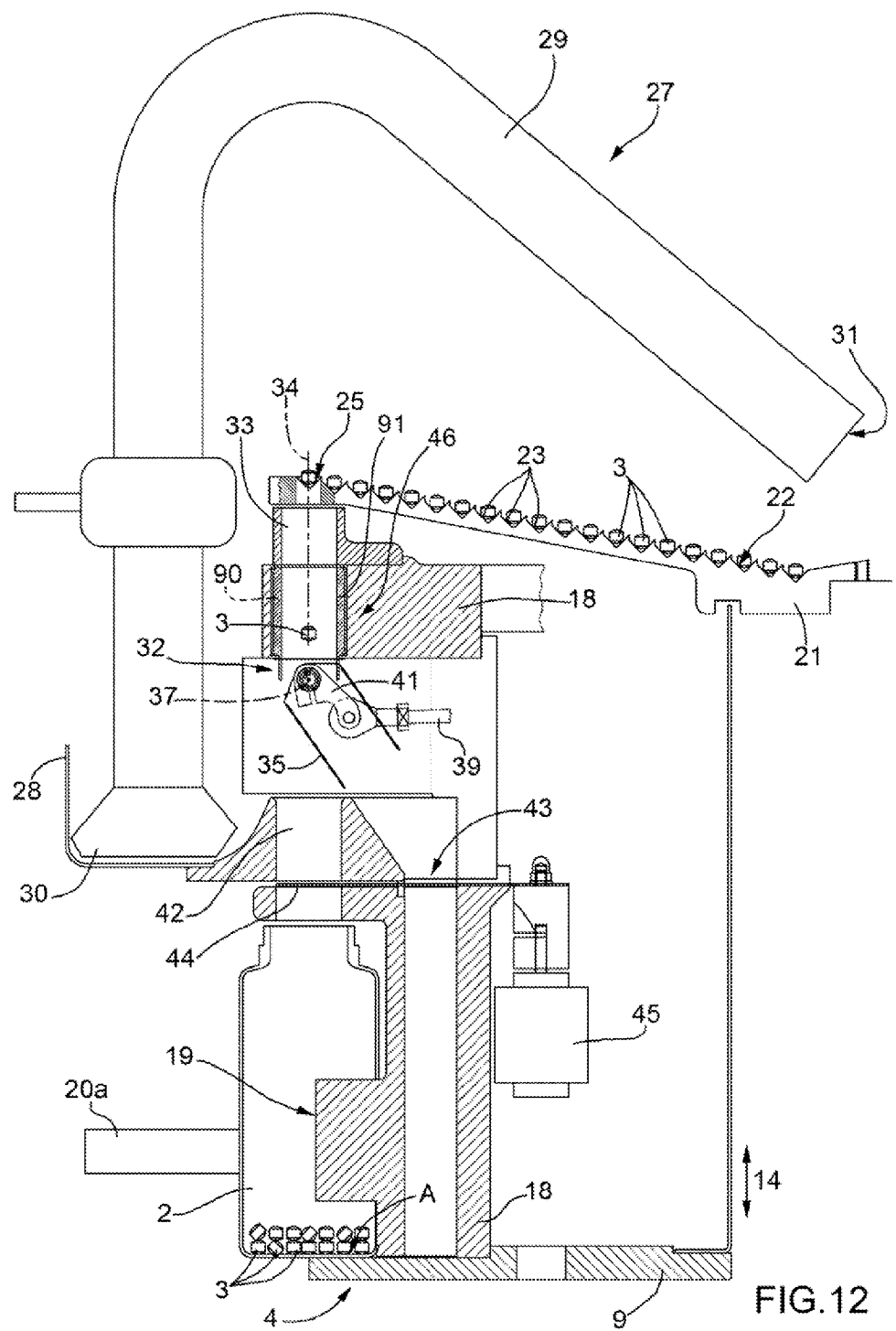
FIG. 12 is similar to FIGS. 3 and 4 and shows a variant of the detail in FIGS. 3 and 4.

According to a variant shown in FIG. 12, each photocell 48 is eliminated and replaced by a capacitance transducer 90 of the known type described, for example, in patent application WO-2006/035285-A2 by the same applicant, the content of which is integrally incorporated in the present patent application.

The capacitance transducer 90 is integrated in a bushing 91 inserted into the upper portion 33 of the corresponding duct 32 coaxially to axis 34, and is suited to measure the weight of the solid form 3 fed each time through portion 33.

The capacitance transducer 90 allows to distinguish between complete solid forms 3 having a weight equal to a given threshold value, and incomplete solid forms 3 having a weight lower than the threshold value itself, and allows the actuating device 36 to move the intermediate portion 35 of duct 32 to a further third reject operating position of the incomplete solid forms 3 into a collecting container (not shown).

Obviously, the incomplete and thus rejected solid forms 3 are not counted by the control unit 47, thus allowing a more reliable, accurate filling of the bottles 2 as compared to the solution with the photocells 48.

According to a variant (not shown), the intermediate portion 35 of each discharge duct 32 is fixed and each duct 32 is provided with a deviating device movable inside the duct 32 itself between said first, second and third operating positions. When the deviating device is arranged in the second operating position and in the third operating position, the solid forms 3 are fed to the collecting manifold 28 and to said collecting container (not shown) by means of respective openings obtained through the duct 32.

The invention claimed is:

1. A machine for filling bottles (2) with solid forms (3) of pharmaceutical products, in particular capsules, pills, pastilles, and/or tablets, the machine comprising a conveying device (4, 5, 7) for moving forward, one after the other, a plurality of bottles (2) along a given path (P); and a dosing device (4), which is arranged along the path (P), and comprises a plurality of feeding channels (23), each of which is suited to feed a given number of solid forms (3) into a relative bottle (2), and presents an inlet 24 for the solid forms 3 to be fed into the feeding channel 23 and an outlet 25 for the solid forms 3 to be discharged from the feeding channel itself; and wherein:

the dosing device (4) comprises a vibrating distribution plate (21), which is assembled so as to continuously rotate around its own longitudinal axis (12), and presents said feeding channels (23);

the feeding channels (23) are wound in a helix around and along said longitudinal axis (12);

said outlets (25) are uniformly distributed along a peripheral edge of the distribution plate (21) and around said longitudinal axis (12); and the conveying device (4, 5, 7) comprises actuating means (11, 50) for continuously moving forward each bottle (2) along the path (P) in phase with a relative said outlet (25).

2. A machine according to claim 1, wherein the distribution plate (21) is delimited by a bottom wall (22) substantially shaped as a truncated cone, on which said feeding channels (23) are obtained.

3. A machine according to claim 1, wherein said inlets (24) are uniformly distributed along a central edge of the distribution plate (21) and around said longitudinal axis (12).

4. A machine according to claim 1, wherein the dosing device (4) comprises, for each feeding channel (23), a respective discharge duct (32) for feeding the solid forms (3), one after the other, from the relative outlet (25) into the relative bottle (2).

5. A machine according to claim 4, wherein at least part of each discharge duct (32) is obtained through the distribution plate (21) beneath the relative outlet (25).

6. A machine according to claim 4 and comprising, furthermore, for each discharge duct (32), a respective interception unit (35, 44), which is mobile between a first operating position, in which the interception unit (35, 44) is arranged so as to allow the solid forms (3) to be fed along the discharge duct (32) and into the relative bottle (2), and a second operating position, in which the interception unit (35, 44) is arranged so as to prevent the solid forms (3) from being fed along the discharge duct (32) and into the relative bottle (2).

7. A machine according to claim 6 and comprising, furthermore, a counting device (46) for calculating the passage of a given number of solid forms (3) through each one of said outlets (25) and, for each discharge duct (32), respective actuating means (36, 45) for moving the relative interception unit (35, 44) between said first and second operating positions according to a signal coming from the counting device (46).

8. A machine according to claim 1, wherein at least part of the path (P) extends around said longitudinal axis (12).

9. A machine according to claim 1, wherein the dosing device (4) comprises a dosing drum mounted so as to rotate around said longitudinal axis (12) and comprising, in turn, the distribution plate (21) and a pocket conveyor (18), which defines part of the conveying device (4, 5, 7), and is provided with a plurality of pockets (19), which are mounted beneath the distribution plate (21), are uniformly distributed around the longitudinal axis (12), and are suited to receive and hold, in each of them, a respective bottle (2).

10. A machine according to claim 9, wherein the conveying device (4, 5, 7) comprises, furthermore, an inlet conveyor (49, 52), which is suited to feed, one after the other, the bottles (2) to said pocket conveyor (18), and is shaped so as to order the bottles (2) with a distribution pitch which is substantially equal to the distribution pitch of the pockets (19) around said longitudinal axis (12).

* * * * *